(No Model.)

J. E. NEHER.
METHOD OF AND APPARATUS FOR RECTIFYING ALTERNATING CURRENTS.

No. 548,217. Patented Oct. 22, 1895.

WITNESSES:
George Brown Jr.
Herbert C. Tener

INVENTOR
Jules E. Neher

UNITED STATES PATENT OFFICE.

JULES E. NEHER, OF PITTSBURG, PENNSYLVANIA, ASSIGNOR TO THE WESTINGHOUSE ELECTRIC AND MANUFACTURING COMPANY, OF SAME PLACE.

METHOD OF AND APPARATUS FOR RECTIFYING ALTERNATING CURRENTS.

SPECIFICATION forming part of Letters Patent No. 548,217, dated October 22, 1895.

Application filed August 7, 1893. Serial No. 482,584. (No model.)

*To all whom it may concern:*

Be it known that I, JULES E. NEHER, a citizen of the Republic of Switzerland, residing in Pittsburg, in the county of Allegheny and State of Pennsylvania, have invented a new and useful Improvement in Methods of and Apparatus for Rectifying Alternating Currents, (Case No. 566,) of which the following is a specification.

My invention relates to a method and means for the rectifying of alternating electric currents; and the particular object of my invention is to so rectify these currents in connection with counter-electromotive-force devices, such as secondary batteries which are being charged by said rectified current, as to prevent the overpowering of the charging or main current by the counter electromotive force of such secondary devices.

As above indicated, my invention is particularly useful in cases where it is desired to charge secondary batteries from alternating-current circuits.

My invention is illustrated in the accompanying drawings, in which—

Figure 1:
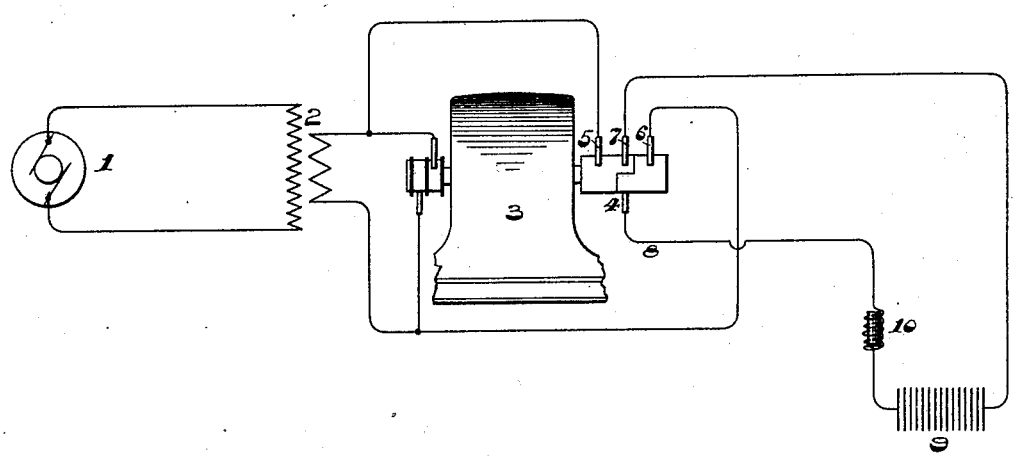
Figure 2:
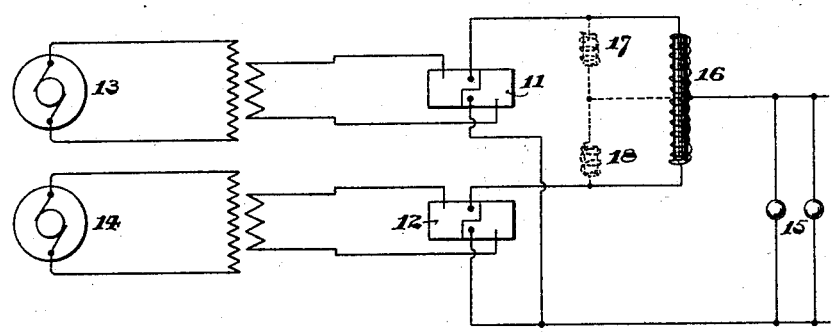

Figure 1 is a diagrammatic view of the apparatus employed by me where single-phase currents are to be utilized, and Fig. 2 is a like view of my apparatus as used with two-phase currents.

Hitherto wherever it has been desired to charge secondary batteries or accumulators from rectified alternating currents some difficulty has been experienced, due to the periodic excess of counter electromotive force over impressed electromotive force, which follows from the fact that the counter electromotive force of the secondary battery is constant, while the impressed electromotive force of the rectified current is necessarily fluctuating and usually between the limits of zero and a maximum. It is the object of my invention to overcome this difficulty and prevent back flow of current at those times when the fluctuating impressed electromotive force of the rectified current is less than the counter electromotive force of the accumulator or other translating device. For this purpose I have devised means (illustrated in the accompanying drawings) wherein the alternating-current generator is shown in diagram at 1, and feeds the primary of a converter 2, from the secondary of which is taken off the alternating current to be rectified. The current to be rectified may, of course, be supplied directly from the generator, Fig. 1 showing merely an example of feeding means.

At 3 is shown a synchronous motor operated by means of the same current which is to be rectified.

At 4 is shown a commutator of any well-known description for the purpose of rectifying the current supplied to the alternating-current brushes 5 and 6. The direct current is taken off at 7 and 8. A two-part commutator is shown as an example, but as many parts will be used as there are changes or alternations in one revolution of the shaft.

The direct current given off at the brushes 7 and 8 is used for charging storage-batteries 9 or for other purposes, and directly in series with the storage-battery or other translating devices 9 I place a choking-coil 10, having a sufficient number of turns to strongly magnetize its core. This is shown in diagram.

As the current normally passing through the choking-coil 10 is always in the same direction, although of a varying electromotive force, the magnetization of the core of this choking-coil will always be in the same sense. Consequently, whenever the balance of electromotive forces tends to produce a current contrary in direction to the charging-current there is a tendency to demagnetize the core of the choking-coil 10, and to this tendency this choking-coil will necessarily oppose a very great resistance. This resistance is indeed so great that where a single-phase alternating current is applied in the manner above indicated there will be at no time a reversal of current in the system.

The utility of the coil 10 cannot be better exemplified than by citing certain experiments which I have made in this regard. Where the coil was not used and where alternating currents were rectified in the above described manner, for the purpose of charging the accumulator, a direct current (Weston ammeter) showed a direct charging-current of five ampères, while a dynamometer showed thirty ampères. The dynamometer evidently registered the sum of the currents irrespective of their directions and the Weston ammeter indicated the difference of these currents. Where the choking-coil 10 was used the ammeter and dynamometer showed the same reading, thus showing that the algebraic sum and the algebraic difference were the same, which is only true where there is no reverse current.

In Fig. 2 I have indicated a modification of my invention wherein two-phase currents are employed. In this figure I have not shown the synchronous motors 3, but have indicated their presence by means of the two commutators 11 and 12. These commutators may be each used with a single synchronous motor or they may be put upon the same shaft of one motor running in synchronism with the generator.

Although in Fig. 2 I have shown two generators at 13 and 14, indicating two sources of current, these will ordinarily correspond to collecting-rings attached to points ninety degrees apart on the commutator of a single generator. In this form it will be seen the secondary alternating current is rectified, each phase at one commutator, and the corresponding pairs of the two commutators are arranged in multiple arc with each other, while between the translating devices 15 and one of these pairs of commutator-brushes is placed a coil 16, so wound that although the rectified current comes from opposite directions toward the middle the core of the coil is constantly magnetized. Of course this magnetization will not only be continuous, but will have the same direction at all times. The operation of this choking-coil will then be clearly to prevent the passage of current from one commutator to the other at times when the electromotive force of the first commutator exceeds that of the second. This form of organization thus exemplifies the use of my system in an arrangement wherein accumulators or secondary batteries may or may not be used.

The choking-coil in either Fig. 1 or Fig. 2 is employed for practically the same purpose. As indicated in dotted lines in Fig. 2, the single coil 16 may be replaced by two coils 17 and 18, connected as shown, each at its outer end to one of the corresponding brushes of the two commutators 11 and 12, and each at their middle or inner ends to one side of the working circuit. In this case each coil will be provided with its own core.

What I claim is—

1. The method of utilizing electric currents derived from an alternating current transmission circuit for supplying translating devices having an approximately constant counter electromotive force, which consists in rectifying the same and transmitting said rectified, fluctuating currents to the translating devices through a choking coil and thus producing a magnetic field of one direction, whereby reversed currents due to the counter electromotive force of said translating devices are prevented, substantially as described.

2. A source of alternating electric current, a synchronous motor operated thereby and means operated by said motor for rectifying a portion of said current; in combination with a source of potential opposed to that of the rectified current, and a choking coil in series with said rectified current and said source of counter potential, substantially as described.

3. A source of alternating current, a synchronous motor driven thereby and a commutator on the shaft of said motor for rectifying a portion of said alternating current; in combination with a secondary battery in circuit with the rectified current, and a choking coil in series with said secondary battery, substantially as described.

In testimony whereof I have hereunto subscribed my name this 4th day of August, A. D. 1893.

JULES E. NEHER.

Witnesses:
HUBERT C. TENER,
GEORGE BROWN, Jr.